United States Patent
Jobard

(10) Patent No.: US 7,986,115 B2
(45) Date of Patent: Jul. 26, 2011

(54) SAFETY DEVICE FOR DETECTING INADEQUATE ELECTRIC BRAKING AND COMMUTATION TO A SAFETY BRAKE

(75) Inventor: Thierry Jobard, Lyons (FR)

(73) Assignee: Alstom Transport SA, Levallois-Perret (FR)

( * ) Notice: Subject to any disclaimer, the term of this patent is extended or adjusted under 35 U.S.C. 154(b) by 371 days.

(21) Appl. No.: 12/231,569

(22) Filed: Sep. 4, 2008

(65) Prior Publication Data

US 2009/0224706 A1    Sep. 10, 2009

(30) Foreign Application Priority Data

Sep. 4, 2007    (FR) ...................................... 07 57341

(51) Int. Cl.
*H02P 3/22*    (2006.01)

(52) U.S. Cl. ........ 318/380; 318/701; 318/438; 318/244; 318/245; 318/246

(58) Field of Classification Search .................. 318/380, 318/244–252, 438, 701
See application file for complete search history.

(56) References Cited

U.S. PATENT DOCUMENTS

| | | | | |
|---|---|---|---|---|
| 5,208,741 A * | 5/1993 | Kumar | ........................... | 363/124 |
| 5,283,507 A * | 2/1994 | Stitt et al. | ....................... | 318/376 |
| 5,644,202 A * | 7/1997 | Toriyama et al. | ............. | 318/369 |
| 6,445,879 B1 | 9/2002 | Youn et al. | | |
| 7,012,392 B2 * | 3/2006 | Nguyen et al. | ................. | 318/376 |
| 2007/0090783 A1 | 4/2007 | Rainer et al. | | |

FOREIGN PATENT DOCUMENTS

| | | |
|---|---|---|
| JP | 08149870 | 6/1996 |
| WO | WO 03/049256 A2 | 6/2003 |

* cited by examiner

*Primary Examiner* — Bentsu Ro
*Assistant Examiner* — David S Luo
(74) *Attorney, Agent, or Firm* — Davidson, Davidson & Kappel, LLC

(57) ABSTRACT

A device is provided for detecting inadequate electric braking and commutation to a safety brake is intended for a vehicle with electric traction, in particular a rail vehicle, which is provided with a traction chain, the system including a first electric, non-safety brake which is integrated in the traction chain and a second safety brake. The device includes a member for commutation from the first brake to the second brake, a device for monitoring the braking performance of the first brake using data for measurement of the intensity of a current, a decision device for commutating from the first brake to the second brake when a predetermined threshold value is exceeded and a device for transmitting a commutation command to the at least one commutation member.

20 Claims, 7 Drawing Sheets

SAFETY DEVICE FOR DETECTING INADEQUATE ELECTRIC BRAKING AND COMMUTATION TO A SAFETY BRAKE

This claims the benefit of FR 07 57341 filed on Sep. 4, 2007 and hereby incorporated by reference herein.

The invention relates to a device for detecting inadequate electric braking and commutation to a safety brake. It is intended for a vehicle which is electrically driven, for example, a rail vehicle.

BACKGROUND OF THE INVENTION

A safety braking system ensures the desired braking force is produced in an extremely reliable manner.

In the field of rail transport, there are principally two types of braking operation: service braking and emergency braking.

The service braking operation is the one which is most commonly used during operation. It can be adjusted between a minimum force value close to 0 and a maximum force value. It can be broken down itself into a plurality of modes, depending on the trains: purely electric brake, purely mechanical brake or combined electric and mechanical brake. It carries out all the "normal" stopping and deceleration operations of the train, and the braking operations for holding on declines. However, it is not secure in the sense that it involves a large number of electric, electronic, mechanical, pneumatic or hydraulic components which may malfunction and therefore bring about a different braking force from that desired, or even, with the new traction chains having traction/static braking commutation, a traction force.

The emergency braking operation is used, as its name suggests, only in the event of an emergency. This emergency condition may be brought about either by an external emergency situation or by a malfunction of the service brake. The object of this brake is to stop the train as quickly and safely as possible. This brake cannot be adjusted but is reliable, that is to say, its probability of failure must be extremely low. This brake must therefore use the fewest possible number of components. Generally, it is purely mechanical, but this requires the mechanical brake to be sized accordingly which may be found to be prohibitive in terms of cost or mass, in particular in a high-speed train where the levels of braking energy to be dissipated are significant. For this reason, it may be very advantageous to produce an electric safety brake.

SUMMARY OF THE INVENTION

An electric safety braking device is described in a French patent application entitled "Safety braking device having a bipolar resistive assembly with permanent magnet motor" in the name of Alstom Transport. However, this device has one disadvantage: the force/speed characteristic thereof is dependent only on the characteristics of the motor and the value of the braking resistance selected, it cannot therefore be adjusted, in particular it may lead to excessive levels of force at high speed which would bring about an excessive level of adhesion or instead to levels of force which are too low at low speed. A device for improving this force/speed characteristic is described in a French patent application entitled "Electric safety braking device with permanent magnet motor and braking torque control" in the name of Alstom Transport, but it is necessary to add an additional item of equipment. These applications are not prior art to the present application.

An object of the device described in this invention is to allow the electric service brake to be used for emergency braking and to use the safety brake only in the event of a malfunction of the electric service brake, which may include the following advantages:

making use of all the possibilities for dynamic control of the service brake in an emergency situation, in order to derive maximum benefit from the wheel/rail adhesion available, placing less stress on the safety brake by using it only in the event of a malfunction of the service brake.

The present invention provides a safety braking system which is intended for a vehicle with electric traction, in particular a rail vehicle, which is provided with a traction chain, the system comprising:

a first electric, non-safety brake which is integrated in the traction chain, a second, safety, brake, characterised in that it comprises a member for commutation from the first brake to the second brake, a monitoring device which is capable of monitoring the braking performance of the first brake using data for measurement of the intensity of a current, a decision device for commutating from the first brake to the second brake when a predetermined threshold value is exceeded by the intensity measurement data, and a device for transmitting a commutation command to the at least one commutation member.

According to specific embodiments, the safety brake may include one or more of the following features:

the first electric brake comprises, in sequence, an electromechanical machine which is capable of operating as a voltage generator, a traction inverter which is capable of being configured as a diode bridge rectifier, an electromechanical commutator for connecting the electromechanical machine to the inverter, a chopper with a chopper brake resistor, the first electric service brake comprises a line filter and a line circuit-breaker;

the electromechanical machine comprises a rotor with permanent magnets;

the electromechanical machine comprises at least two coils which allow at least two currents to flow which are mutually dephased;

the second brake is of the mechanical type;

the second brake is an electric brake;

the second electric brake comprises the electromechanical machine, a braking torque production device, the electromechanical commutator which is capable of connecting the electromechanical mechanism to the braking torque production device;

the braking torque production device comprises a diode bridge rectifier and a resistor;

the second electric brake comprises the diode bridge rectifier of the traction inverter, a terminal load resistor, an auxiliary electromechanical relay which is connected in series to the resistor and which is controlled at an input, the assembly comprising the relay and the resistor being interposed between the chopper and the inverter;

the monitoring device is mounted in series with the inverter;

the monitoring device is mounted in series with the brake resistor of the chopper;

the monitoring device, the decision device and the device for transmitting a commutation command together form a current relay; and the threshold value of the decision device is selected so as to be below a substantially constant range of current intensity values observed by the monitoring device when the rotation speed of the rotating electromechanical machine decreases from a maximum value, the first brake being active, the decision of the decision device is delayed from the point at which a predetermined threshold value is exceeded, the decision of the decision device is deactivated when the speed is lower than a predetermined threshold.

The invention also relates to a safety braking method which is intended for a vehicle with electric traction, in particular a rail vehicle, comprising the steps involving:

activating a first electric non-safety brake, monitoring the performance of the first electric non-safety brake using measurements of at least one variable which is representative of the braking force produced by the first electric brake, detecting when this variable falls below a threshold value, commutating the braking of the first electric non-safety brake to the second safety brake by isolating the first brake from the electromechanical machine and activating the second safety brake.

According to specific embodiments, the safety braking method may include the following feature:

the second safety brake is an electric brake.

BRIEF DESCRIPTION OF THE DRAWINGS

The invention will be better understood from a reading of the description of the embodiments which will follow and which are given purely by way of example and with reference to the drawings, in which.

DETAILED DESCRIPTION OF THE PREFERRED EMBODIMENT

Figure 1:
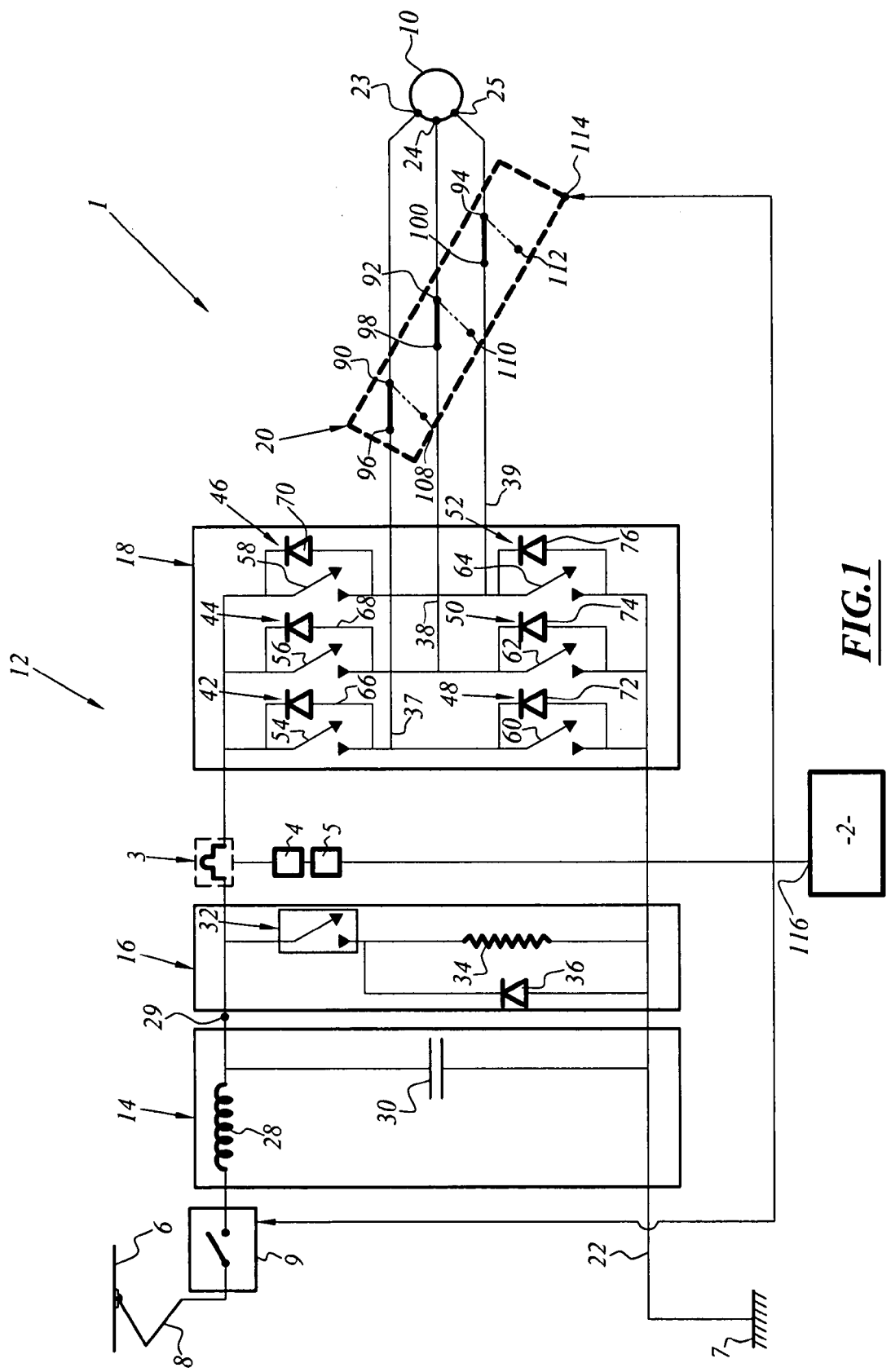
FIG. 1 is a schematic view of a first embodiment of a braking system comprising a first electric, non-safety service brake, and a second mechanical safety brake.

FIG. 1 illustrates a first embodiment of a braking system which is referred to as a safety braking system and which is associated with an electric traction chain 1 of a rail vehicle.

The braking system comprises a first electric service brake which is integrated in the electric traction chain 1 and a second safety brake 2 which is in this instance mechanical.

The braking system also comprises a device 3 for monitoring the braking performance of the first brake using current intensity measurement data, a detection device 4 which is capable of reaching the decision to commutate from the first brake to the second brake when a predetermined threshold value is exceeded by the intensity measurement data and a device 5 for transmitting a commutation command.

The traction chain 1 is supplied with electrical power by means of a catenary line (or a third rail) 6 which is under high voltage and which is referenced by a ground 7 which is connected to the earth.

The electric traction chain 1 comprises a pantograph (or skate) 8 for capturing electrical energy from the catenary line (or the third rail) 6 followed by a line circuit-breaker 9 which acts as a main switch/contactor between the traction chain 1 and the catenary line (or the third rail) 6.

The traction chain 1 also comprises a rotating electromechanical machine 10 which is capable of being supplied with electrical power via an electronic power converter 12.

The electronic power converter 12 comprises, in sequence from the circuit-breaker 9 to the electromechanical machine 10, a line filter 14, a rheostatic braking chopper 16 and a traction inverter 18, in this instance having a three-phase output which is capable of supplying the electromechanical machine 10 with electrical power via an electromechanical connection commutator 20.

All of the elements of the traction chain 1 are connected to the common ground 7 via an earth return line 22.

The rotating electromechanical machine 10 comprises a stator which in this case has a three-phase alternating power supply and which is provided with electrical input terminals 23, 24, 25 and a rotor whose excitation is provided by a permanent magnet.

In electric traction mode, the electromechanical machine 10 operates as a motor while, in electric braking mode, the mechanism operates as a voltage generator.

The first electric service brake comprises components of the traction chain 1, in particular the rotating electromechanical machine 10, the inverter 18, the rheostatic braking chopper 16 and the line filter 14.

The line filter 14 comprises in this instance a conventional "LC" structure which is formed on the one hand by a line inductor 28 which is mounted in series between the circuit-breaker 9 and a line input 29 of the chopper 16 and, on the other hand, a capacitor 30 which is electrically connected in parallel close to the input 29 of the chopper 16.

The rheostatic braking chopper 16 comprises a power transistor 32 of the IGBT type (Insulated Gate Bipolar Transistor) which acts, for example, as a regulator and which is connected in series to a rheostatic brake resistor 34.

The chopper 16 also comprises a free wheel diode 36 which is connected in parallel to the brake resistor 34.

The inverter 18 comprises three alternating three-phase output lines 37, 38, 39 which are each capable of being connected to an electric stator phase input terminal 23, 24, 25, respectively, of the motor 10 via a connection which is produced using the electromechanical commutator 20.

The inverter 18 has a conventional structure having 6 electronic power switches 42, 44, 46, 48, 50, 52 which are connected in three phases connected between the output of the input filter 14 and the return line 22.

Each electronic power switch 42, 44, 46, 48, 50, 52 comprises a power transistor 54, 56, 58, 60, 62, 64 which is, for example, of the IGBT type and which can be controlled in a conductive state/non-conductive state for a control current, each power transistor being associated with a free wheel diode 66, 68, 70, 72, 74 and 76 which is mounted in an anti-parallel manner thereon. In this instance, in FIG. 1, the arrow of each power transistor represents the flow direction of the current when this transistor is conductive.

Each power switch 42, 44, 46 is associated with a power switch 48, 50, 52, respectively, the output of one of the first switches being connected to the input of one of the second switches and forming an output of the inverter, each output being connected to an output line 37, 38, 39 of the inverter, respectively.

The control circuits of the commutation cells are not illustrated in FIG. 1 and are assumed to be capable of providing the motor 10 with a synchronous traction function.

The electromechanical commutator 20 comprises an assembly of three input pins 90, 92, 94 which are connected to the electric input terminals 23, 24, 25 of the stator phases of the motor 10, respectively.

The electromechanical commutator 20 also comprises a first group of output pins 96, 98, 100 which are connected to the output lines 37, 38, 39 of the inverter 18, respectively.

The electromechanical commutator 20 also comprises a second group of output pins 108, 110, 112 which are electrically isolated and which are capable of being connected to the input pins 90, 92, 94, respectively, in order to isolate the motor from the inverter 18.

The electromechanical commutator 20 comprises a command input 114 which is capable of receiving a commutation command which allows the contactors which form connections between the input pins and the output pins to be commutated from one group to the other.

The electromechanical commutator 20 has a high degree of reliability and therefore safety.

In this instance, the assembly constituted by the monitoring device 3, the detection device 4 and the transmission device 5 is produced by a single component: a current relay.

In a variant, the devices 3, 4 and 5 form a discrete assembly of three separate components.

The monitoring device 3 is connected in this instance, in FIG. 1, between the inverter 18 and the rheostatic braking chopper 16.

The transmission device 5 transmits at the output a commutation command signal when the current measured by the current relay is below a predetermined threshold value.

The engaged/disengaged state output of the transmission device 5 is connected to an activation command input 116 of the mechanical brake 2 and to the command input 114 of the electromechanical relay 20 which is capable of connecting/disconnecting the motor 10 from the inverter 18.

During traction operation, the traction chain 1 described in FIG. 1 is configured to supply the motor 10 with electrical power by means of the catenary line 6 via the inverter 18.

The electronic power converter 12 uses an inverter configuration which is supplied with direct current, the line circuit-breaker 9 being closed and the transistor of the chopper 16 being open.

The electromechanical commutator 20 is configured in this instance so as to provide the connection of the output lines 37, 38, 39 of the inverter 18 to the supply inputs 23, 24, 25 of the stator of the motor.

During a service braking operation, the electromechanical commutator 20 remains in the same state as during traction operation.

The inverter 18 is configured to operate in rectifier mode and the chopper 16 limits the braking power that is conveyed in the line 6 to the maximum power which it is able to receive, any surplus of braking power being dissipated in the resistor 34.

This operating mode is the conventional operating mode referred to as combined recovery/rheostatic mode.

It is also possible to operate in pure rheostatic braking mode. In this instance, the line circuit-breaker 9 is open, the inverter also operates in rectifier mode and provides in the rheostatic brake resistor 34 a rectified current in accordance with the value of the rheostatic resistor 34 of the chopper 16 and the output voltage of the inverter 18. This operating mode is often selected when the electric brake is used for emergency braking since the opening of the circuit-breaker ensures that the torque produced by the motor cannot be positive, that is to say, traction torque.

Even in this pure rheostatic mode, the braking torque is actively controlled by the inverter 18 which operates as a rectifier, the electronic switch 32 of the chopper 16 being kept in a state of permanent or almost permanent conduction, owing to the fact that no electrical energy can be conveyed in the line 6 since the circuit-breaker 9 is open.

In this manner, regardless of the operating mode of the electric service brake used during emergency braking (combined recovery/rheostatic mode or pure rheostatic mode), the braking torque can be controlled in a dynamic manner in accordance with the speed of the wheels and the wheel/rail adhesion available. This brake therefore may have the maximum level of efficiency but it may not be reliable since it involves an excessively high number of components.

The device 4 for detecting from the monitoring device 3 provides reliable information as to whether this electric brake has an adequate level of efficiency simply by comparing the current which is passing through this device 3 with a predetermined threshold. Since the braking force required during emergency braking is constant (non-adjustable brake), the development of the current in accordance with the speed of the train in this device will have approximately the shape given in FIG. 7.

The detection device 4 may be therefore capable of reliably detecting an inadequate level of electric braking force on the basis of the monitoring device 3.

In the event that an inadequate level of electric braking force is detected, the commutation device 5 may be therefore capable of reliably commutating from the electric brake 1 to the safety brake 2. To this end, it sends a commutation command to the input 114 of the commutator 20 and to the input 116 of the safety brake 2. If the service brake mode used during emergency braking is the combined recovery/rheostatic mode, it can also send an opening command to the circuit-breaker 9 in order to ensure that the equipment 1 cannot move into traction mode.

In a variant, there may be provision to delay the validation of detection by the decision device, for example, by one or two seconds, in order to filter out any interference such as a false alarm.

In another variant, there may be provision to deactivate the commutation device below a predetermined speed threshold, the detection device 4 being provided with an input, which is not illustrated in the Figure, for a train speed signal, in order to prevent the device from switching to the safety brake at low speed, even when the service brake is operating correctly. The characteristic of the current monitored in accordance with the speed (cf. FIG. 7) ensures that this current necessarily passes below the monitoring threshold when the speed becomes very low. In order to maintain the reliable nature of the device, this speed threshold must itself be reliable.

Figure 2:
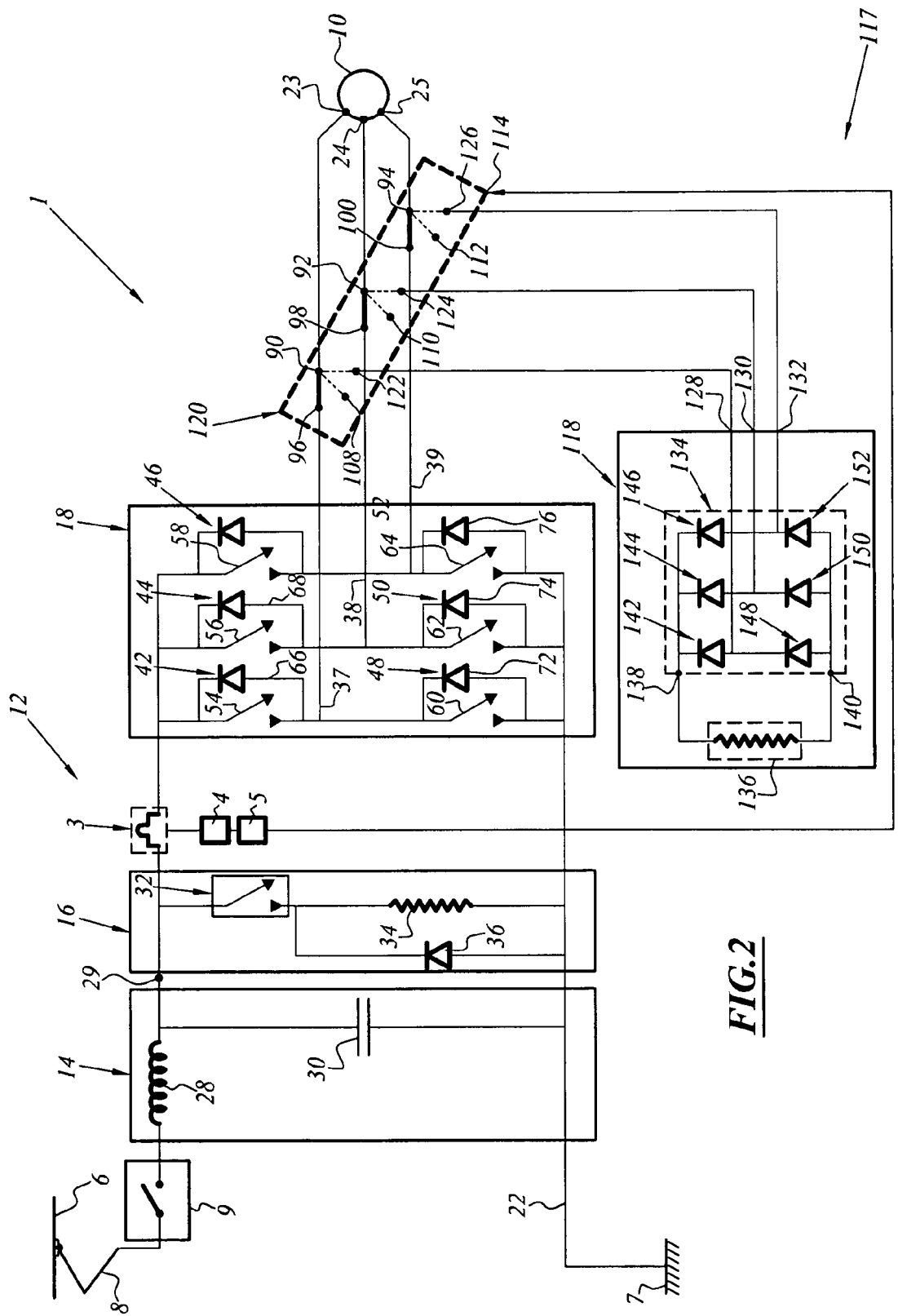
FIG. 2 is a schematic view of a second embodiment of a braking system, in this instance all electrical, comprising a first non-safety electric service brake and a second electric safety brake.

FIG. 2 illustrates a second embodiment of a safety braking system associated with a traction chain 1, which is identical to that described in FIG. 1.

Only the safety brake 2 is different and in this instance is an electric brake 117 which comprises a braking torque production device 118 and the electromechanical commutator 20 which in this instance is an electromechanical commutator 120 comprising a third group of output pins 122, 124, 126 which are connected to inputs 128, 130, 132 of the braking torque production device 118, respectively.

The second electric brake 117 comprises the generator 10, the electromechanical commutator 120 and the braking torque production device 118.

The electromechanical commutator 120 is capable of disconnecting the input terminals 23, 24, 25 of the motor from the output lines 37, 38, 39 of the inverter 18 by commutating electric contacts of the first group of pins 96, 98, 100 to the second group of output pins 108, 110, 112 and thus isolating the motor 10 from the inverter 18.

The commutator 120 is also capable of connecting the input terminals 23, 24, 25 to the inputs 128, 130, 132 of the braking torque production device 118 of the second brake 117.

The braking torque production device 118 comprises a conventional diode bridge rectifier 134, in this instance a three-phase rectifier, which is capable of being supplied with electrical power at the inputs 128, 130, 132 and a terminal load resistor 136 which is connected to the bridge at outputs 138 and 140. The diode bridge rectifier in this instance comprises six diodes 142, 144, 146, 148, 150, 152 which are illustrated in FIG. 2.

The diode bridge rectifier 134 and the load resistor 136 are both electrical components which are purely passive and require no control.

With the safety braking system described in FIG. 2, the same operating modes as those of FIG. 1 are obtained, with the exception of the braking mode which is referred to as the safety braking mode.

In so-called safety braking mode, when the monitoring device 3 and decision device 4 detect an image current value of the first electric brake below the threshold value, a commutation of the first electric brake to the second brake 117 is carried out by the electromechanical commutator 120.

The electromechanical commutator 120 disconnects the electromechanical mechanism 10 from the inverter 18 when it receives the command to commutate to the second brake 117 from the transmission device 5 and connects the generator 10 to the braking torque production device 118.

Figure 3:
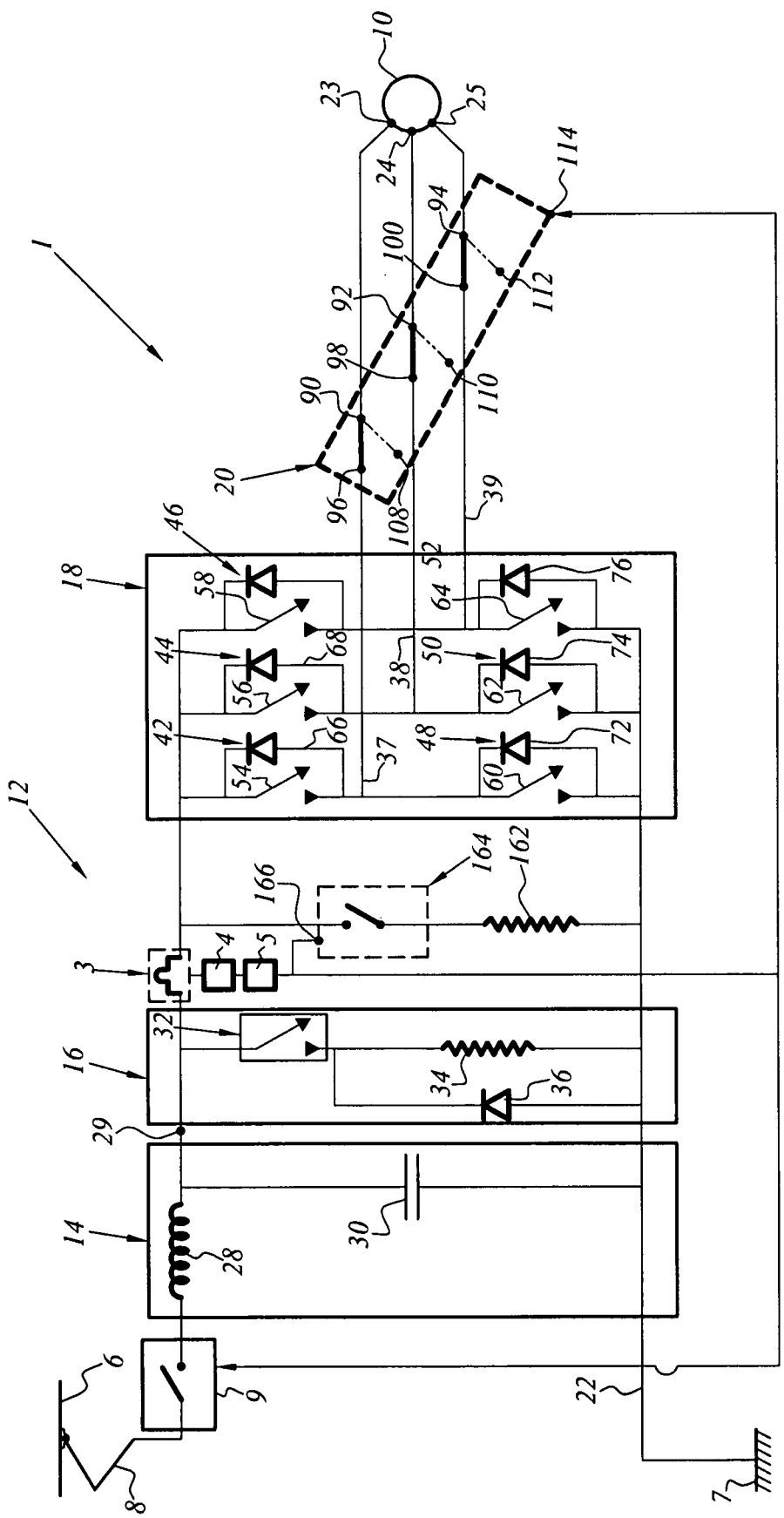
FIG. 3 is a schematic view of a third embodiment of a braking system, in this instance all electrical, comprising a first non-safety electric service brake and a second electric safety brake.

FIG. 3 represents a third embodiment of a safety brake system associated with a traction chain 1 identical to that of FIGS. 1 and 2.

Compared with the system described in FIG. 1, the second brake in this instance is an electric brake comprising the free wheel diode bridge 66, 68, 70, 72, 74, 76 of the inverter 18, a terminal load resistor 162, an auxiliary electromechanical relay 164 which is connected in series to the resistor 162 and controlled at an input 166, the assembly comprising the relay 164 and the resistor 162 being interposed between the chopper 16 and the inverter 18.

The second electric brake also comprises an auxiliary circuit, which is not illustrated in this instance in FIG. 3, and which is capable of inhibiting the commands for the power transistors of the inverter 18 to be placed in a conductive state.

The assembly of the devices 3, 4, 5 is similar to that of FIG. 1.

In this instance, however, the output of the transmission device 5 or output of the current relay is connected to the input 114 of the electromechanical commutator 164 for connecting the load 162 of the second brake to the circuit for inhibiting the commands to close the power transistors of the inverter 18 and, if necessary, to the command unit for opening the circuit-breaker 9.

With the safety braking system described in FIG. 3, the same operating modes as those of FIGS. 1 and 2 are obtained, with the exception of the braking mode referred to as the safety braking mode.

In this braking mode, the commands of the transistors of the inverter 18 are inhibited in response to the commutation order sent by the transmission device 5.

The commutation to the second electric brake is ensured by the closure of the auxiliary electromechanical relay 164 on the resistor 162 for producing safety braking torque.

Complementary scenarios for dissipation of the electrical energy in the case of FIGS. 2 and 3 may be provided but are not described in this instance.

Figure 4:
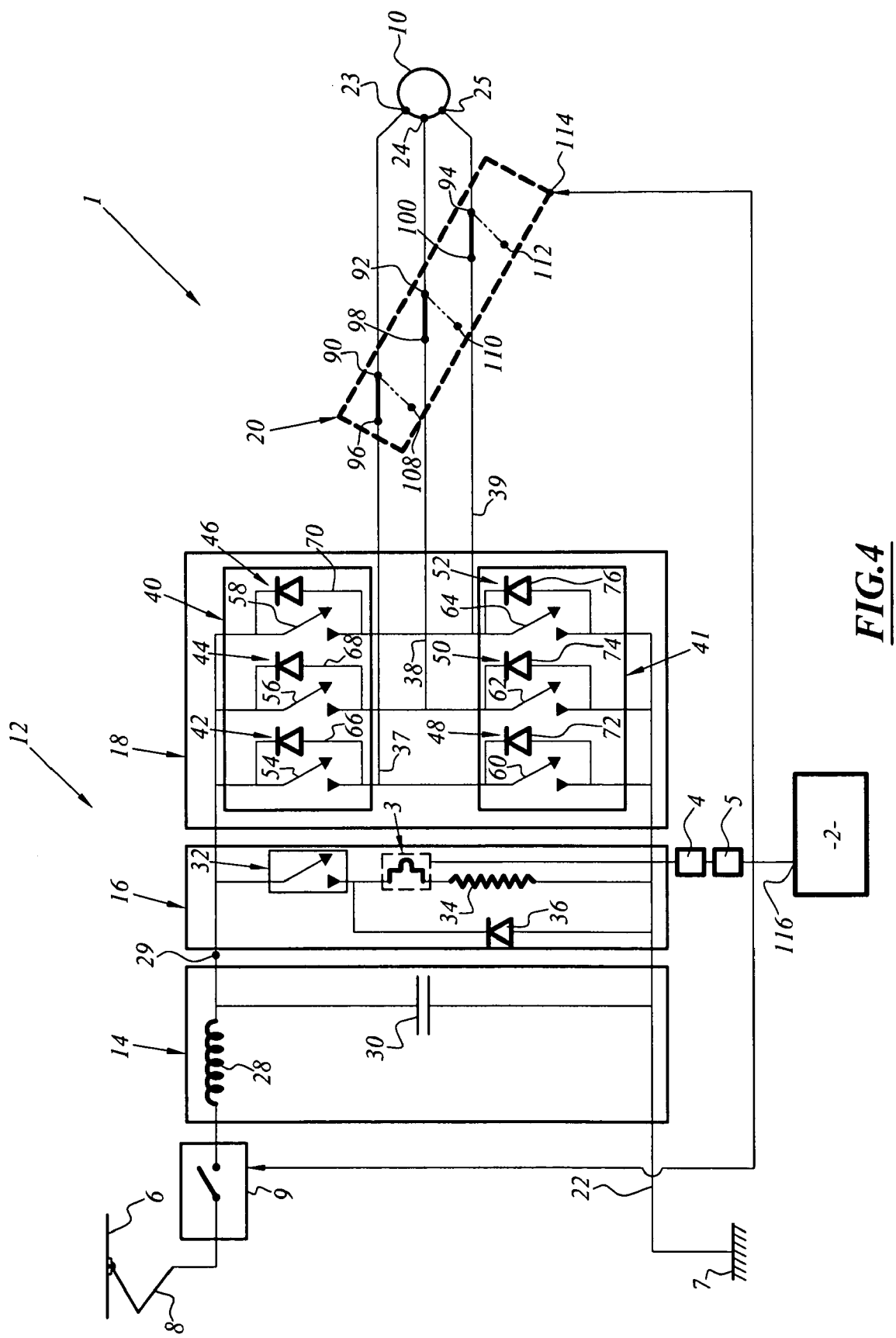
FIG. 4 is a schematic view of a variant of the first embodiment described in FIG. 1.

FIG. 4 illustrates a variant of the first embodiment of the safety braking system of FIG. 1, in which all of the devices 3, 4, 5 are placed in series with the resistor 34 of the chopper 16.

The operation of the braking system of FIG. 4 is similar to that of FIG. 1, with the difference that the service braking used in this instance during the emergency braking operation is the pure rheostatic braking, the circuit-breaker 9 being open.

Figure 5:
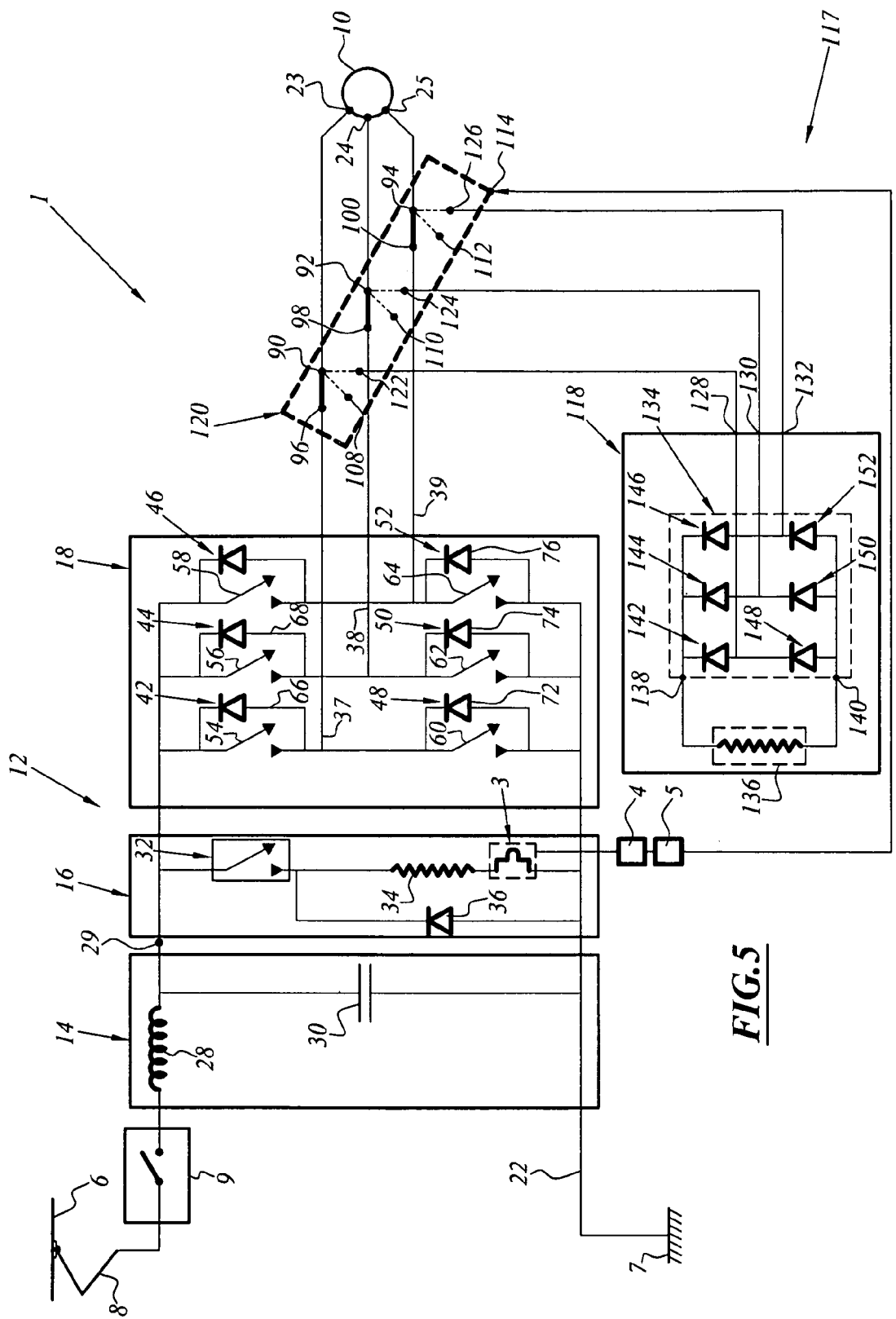
FIG. 5 is a schematic view of a variant of the second embodiment of FIG. 2.

FIG. 5 is a variant of the second embodiment of the safety braking system of FIG. 2 in which the current relay formed by 3, 4, 5 is placed in series with the resistor 34 of the chopper 16.

The operation of the braking system of FIG. 5 is similar to that of FIG. 2 with the difference that in this instance the service brake used during an emergency braking operation is the pure rheostatic mode as in FIG. 4.

Figure 6:
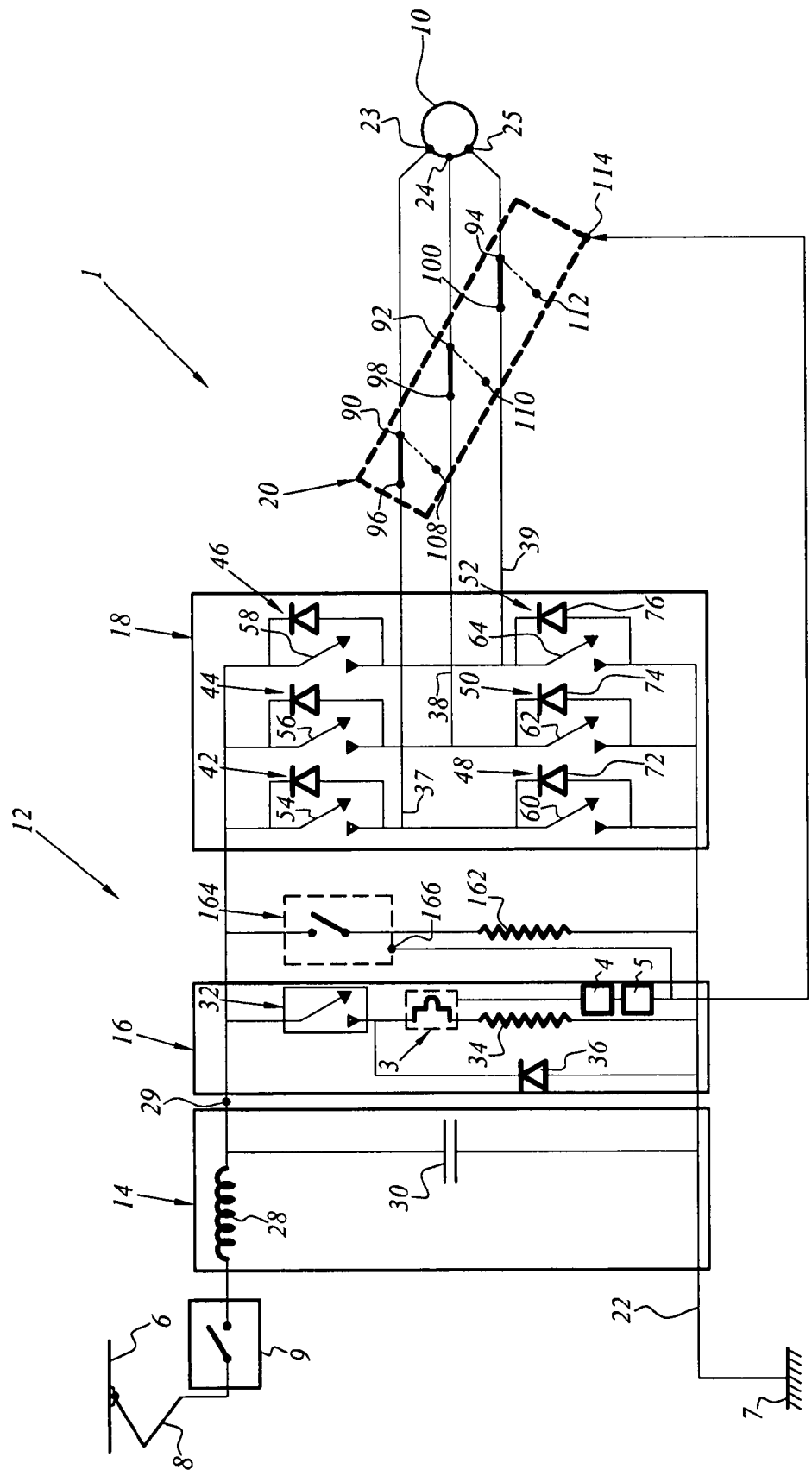
FIG. 6 is a schematic view of a variant of the third embodiment described in FIG. 3.

FIG. 6 illustrates a variant of the third embodiment of the safety braking system of FIG. 3 in which the current relay 3, 4, 5 is interposed in series with the resistor 34 of the rheostatic braking chopper 16.

The operation of the braking system of FIG. 6 is similar to that of FIG. 3 but with the difference that the service brake used in this instance in the event of emergency braking is the pure rheostatic brake as in FIGS. 4 and 5.

Figure 7:
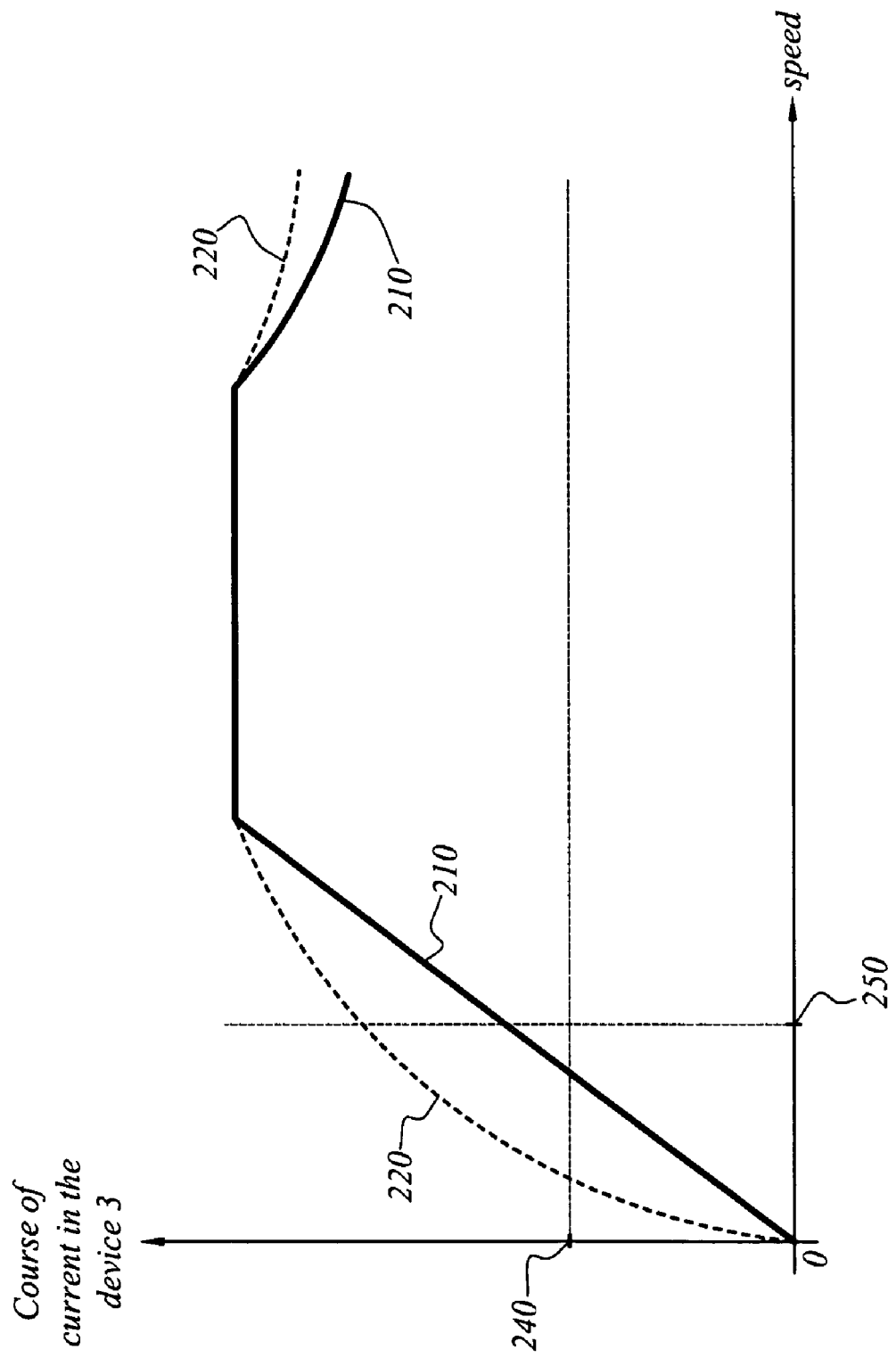
FIG. 7 is a current line as a function of the rotation speed of a traction motor, based on which a threshold is determined for initiating a current relay.

FIG. 7 illustrates the course of the intensity of the current passing through the monitoring device 3 in accordance with the rotation speed of the motor, that is to say, the speed of the train in the absence of locking. This Figure provides two possible courses for the current in the form of the lines 210 and 220, depending on whether the device 3 is placed on the line between the rheostatic chopper 16 and the inverter 18 (as in FIGS. 1, 2, 3, illustrated by the line 210) or placed in series with the brake resistor (as in FIGS. 4, 5, 6 illustrated by the line 220). This Figure illustrates that a threshold 240 for monitoring the current, below which the decision device 4 detects the inadequacy of electric braking may be selected from a large range of values.

This Figure also shows that the current tends towards 0 when the speed tends towards 0. It will therefore inevitably fall below the monitoring threshold at a specific speed which is quite low. The detection device 4 will therefore detect an occurrence of inadequate electric braking at low speed, which is quite normal since an electric braking force can never be totally produced up to zero speed. The commutation device 5 will therefore move the brake to the second safety brake. This is not disadvantageous a priori. However, it may be desirable to avoid this, for example, if this transition brings about a degree of surge in braking torque (which is nonetheless generally acceptable since this involves only emergency braking which is rarely used). In order to avoid this, it is possible to inhibit the detection device 4 below a specific speed threshold 250 (example given in FIG. 7). In this instance, it will of course be necessary for this speed threshold to be reliable in order not to lose the safety nature of the device.

An advantage afforded by the safety braking system described in FIGS. 1 to 6 is the fact that the first electric service brake monitored by the monitoring device 3 may be used in a braking scenario of the safety type and may benefit at the same time from its capacity for controlling braking torque in accordance with the rotation speed of the wheels.

The safety braking system as described may include the advantages of: making use of all the possibilities for dynamic control of the service brake in an emergency situation, in order to derive maximum benefit from the wheel/rail adhesion available, placing less stress on the safety brake by using it only in the event of a malfunction of the service brake.

The combined action of the monitoring device 3, decision device 4, device 5 for transmitting a commutation command and a second safety brake 2,117 ensures the safety of the braking system.

With such a braking system, the control of the braking torque may be ensured at high speed and the spatial requirement of the braking system may be reduced compared with using only a mechanical safety braking system.

Furthermore, active control may be more efficient and less cumbersome than passive control which is carried out on an electric safety braking system of the passive type.

What is claimed is:

1. A safety braking system for a vehicle with electric traction including a traction chain, the safety braking system comprising:
   a first, electric, non-safety brake which is integrated in the traction chain;
   a second, safety, brake;
   at least one member for commutation from the first brake to the second brake, the at least one member including an electromechanical commutator for connecting and isolating an electromechanical machine to and from a traction inverter;
   a monitoring device capable of monitoring the braking performance of the first brake using data for measurement of an intensity of a current;
   a decision device for commutating from the first brake to the second brake when a predetermined threshold value is exceeded by the intensity measurement data; and
   a device for transmitting a commutation command to the at least one commutation member.

2. The safety braking system as recited in claim 1 wherein the vehicle is a rail vehicle.

3. The braking system according to claim 1 wherein the first electric brake includes, in sequence, the electromechanical machine the inverter the electromechanical commutator, and a chopper with a chopper brake resistor, the electromechanical machine being capable of operating as a voltage generator, the traction inverter being capable of being configured as a diode bridge rectifier.

4. The braking system according to claim 3 wherein the monitoring device is mounted in series with the inverter.

5. The braking system according to claim 3 wherein the monitoring device is mounted in series with the brake resistor of the chopper.

6. The braking system according to claim 1 wherein the first electric service brake includes a line filter and a line circuit-breaker.

7. The braking system according to claim 1 wherein the first electric service brake includes the electromechanical machine, the electromechanical machine including a rotor with permanent magnets.

8. The braking system according to claim 1 wherein the first electric service brake includes the electromechanical machine, the electromechanical machine including at least two coils which allow at least two currents to flow which are mutually dephased.

9. The braking system according to claim 1 wherein the second brake is of the mechanical type.

10. The braking system according to claim 1 wherein the second brake is an electric brake.

11. The braking system according to claim 10 wherein the second electric brake includes the electromechanical machine, a braking torque production device, and the electromechanical commutator, the electromechanical commutator being capable of connecting the electromechanical machine to the braking torque production device.

12. The braking system according to claim 11 wherein the braking torque production device includes a diode bridge rectifier and a resistor.

13. The braking system according to claim 10 wherein the second electric brake includes a diode bridge rectifier of the traction inverter, a terminal load resistor, an auxiliary electromechanical relay connected in series to the terminal load resistor and controlled at an input, the relay and the resistor being interposed between a chopper and the inverter.

14. The braking system according to claim 1 wherein the monitoring device, the decision device and the device for transmitting a commutation command together form a current relay.

15. The braking system according to claim 1 wherein the threshold value of the decision device is selected so as to be below a substantially constant range of current intensity values observed by the monitoring device when a rotation speed of the rotating electromechanical machine decreases from a maximum value, the first brake being active.

16. The braking system according to claim 1 wherein the decision of the decision device is delayed from a point at which a predetermined threshold value is exceeded.

17. The braking system according to claim 1 wherein the decision of the decision device is deactivated when a speed is lower than the predetermined threshold.

18. A safety braking method for a vehicle with electric traction comprising the steps of:
   activating a first electric non-safety brake;
   monitoring a performance of the first electric non-safety brake using measurements of at least one variable which is representative of the braking force produced by the first electric brake;
   detecting when the at least one variable falls below a threshold value; and
   commutating the braking of the first electric non-safety brake to a second safety brake by isolating the first brake from an electromechanical machine with an electromechanical commutator and activating the second safety brake.

19. The safety brake method as recited in claim 18 wherein the vehicle is a rail vehicle.

20. The safety braking method according to claim 18 wherein the second safety brake is an electric brake.

* * * * *